United States Patent [19]
Fauran et al.

[11] 3,821,215
[45] June 28, 1974

[54] NOVEL DERIVATIVES OF SUBSTITUTED TETRAHYDRO M-OXAZINES, THEIR PROCESS OF PREPARATION AND THEIR THERAPEUTIC APPLICATION

[75] Inventors: Claude P. Fauran; Colette Douzon; Guy M. Raynaud, all of Paris; Micheline Y. Sergant, Clamart, all of France

[73] Assignee: Delalande S.A., Courbevoie, France

[22] Filed: May 5, 1972

[21] Appl. No.: 250,741

[30] Foreign Application Priority Data
May 7, 1971   France .............................. 71.16526

[52] U.S. Cl. ........ 260/244 R, 260/247.5 R, 424/248
[51] Int. Cl. ............................................. C07d 87/08
[58] Field of Search ......................... 260/244, 247.5

[56] References Cited
OTHER PUBLICATIONS
Humphreys et al., J. Chem. Soc. (London), p. 1298-1-304 (1931).

Primary Examiner—Harry I. Moatz
Attorney, Agent, or Firm—Woodhams, Blanchard & Flynn

[57] ABSTRACT

Compounds of the formula

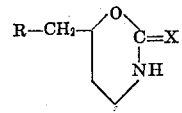

in which X is oxygen or sulfur and R is methoxy, phenoxy or morpholino, are prepared by cyclizing the corresponding 1-substituted-4-amino-2-butanol with a compound containing a

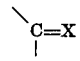

group. The compounds possess analgesic, spasmolytic, vasodilatory, hypertensive and antidepressive properties.

10 Claims, No Drawings

NOVEL DERIVATIVES OF SUBSTITUTED TETRAHYDRO M-OXAZINES, THEIR PROCESS OF PREPARATION AND THEIR THERAPEUTIC APPLICATION

The present invention relates to novel derivatives of substituted tetrahydro m-oxazines, their process of preparation and their therapeutic application.

The novel derivatives according to the invention correspond to the general formula:

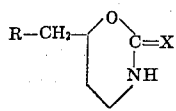

(I)

in which:
X represents an oxygen or sulfur atom, and
R represents a methoxy, phenoxy or morpholino radical.

The process according to the invention consists in cyclising an amino-alcohol of the general formula:

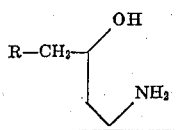

(II)

in which R has the same signification as in formula I, with a compound containing the group

(III)

in which X has the same signification as in formula I.

More particularly, when X represents an oxygen atom, the compound of formula III may be phosgene or ethyl carbonate. When X is a sulfur atom, the compound of formula III may be thiophosgene or the bis (imidazolyl) thione.

The following preparations are given by way of example to illustrate the invention.

EXAMPLE 1

6-Phenoxymethyl tetrahydro m-oxazine-2-one.
(Code No. 69218)

36g. of 1-phenoxy-4-amino-2-butanol, in solution in 150 ml of benzene, was introduced into a 1 litre balloon-flask and heated to 30°C. 200 ml of a solution of 20% phosgene in toluene and 500 ml of a solution of 10% potassium carbonate were simultaneously added thereto, drop by drop and with good agitation. The temperature increases rapidly. The flask is cooled so that the temperature increase does not exceed 30°C. The product so formed, which is insoluble, is dried and recrystallized from dioxan.

Melting point = 145°C
Yield = 78%
Empirical formula = $C_{11}H_{13}NO_3$

Elementary analysis:

|  |  | C | H | N |
|---|---|---|---|---|
| Calculated | % | 63.75 | 6.32 | 6.76 |
| Found | % | 63.86 | 6.46 | 6.86 |

EXAMPLE 2

6-N-morpholinomethyl-tetrahydro-m-oxazine-2-one
(Code No. 69233)

A solution of 5g. of sodium methylate in 100 ml of toluene is first prepared. This solution is heated to boiling and a mixture of 1-morpholino-4-amino-2-butanol (35g) and ethyl carbonate (38g) is slowly added thereto. The ethanol is distilled off as it is formed. The solvents are removed. The residue is taken up in ethanol and treated with hydrochloric acid, the hydrochloride formed is dried and crystallised from 96° ethanol.

Melting point = 240°C (with decomposition)
Yield = 50%
Empirical formula = $C_9H_{17}Cl\ N_2O_3$ Elementary analysis:

|  |  | C | H | N |
|---|---|---|---|---|
| Calculated | % | 45.67 | 7.24 | 11.84 |
| Found | % | 45.55 | 7.30 | 11.84 |

EXAMPLE 3

6-Methoxymethyl tetrahydro-m-oxazine-2-one
(Code No. 70108)

This compound is obtained according to the identical mode of operation described in Example 2, using 1-methoxy-4-amino-2-butanol and ethyl carbonate.

Melting point = 60°C
Yield = 35%
Empirical formula = $C_6H_{11}NO_3$

Elementary analysis:

|  |  | C | H | N |
|---|---|---|---|---|
| Calculated | % | 49.64 | 7.64 | 9.65 |
| Found | % | 49.53 | 7.76 | 9.81 |

EXAMPLE 4

6-Phenoxymethyl tetrahydro-m-oxazine-2-thione
(Code No. 70264)

A solution of 25% soda and a solution of 1-phenoxy-4-amino-2-butanol in dichloroethane are agitated and heated to 50°C. 25g of pure thiophosgene are added thereto, and the mixture is allowed to stand for 2 hours. The product formed is dried and recrystallised from 96° alcohol.

Melting point = 148°C
Yield = 35%
Empirical formula = $C_{11}H_{13}NO_2S$

Elementary analysis:

|  |  | C | H | N |
|---|---|---|---|---|
| Calculated | % | 59.17 | 5.87 | 6.27 |
| Found | % | 59.15 | 5.77 | 6.43 |

EXAMPLE 5

6-Morpholinomethyl tetrahydro-m-oxazine-2-thione
(Code No. 70327)

35g of 1-morpholino-4-amino-2-butanol are dissolved in 1.5 l of water and 67g of sodium bicarbonate is added thereto. The mixture is heated to 40°C and 46g of thiophosgene is added thereto; after 3 hours in contact, the solution is concentrated under reduced pressure, and extracted with chloroform. After having concentrated the solution, the product obtained is recrystallised from isopropyl alcohol.

Melting point = 133°C
Yield = 25%
Empirical formula = $C_9H_{16}N_2O_2S$

Elementary analysis:

|  |  | C | H | N |
|---|---|---|---|---|
| Calculated | % | 49.97 | 7.46 | 12.95 |
| Found | % | 49.79 | 7.40 | 13.09 |

EXAMPLE 6

6-Methoxymethyl tetrahydro-m-oxazine-2-thione (Code No. 70400)

This compound is obtained according to the identical mode of operation described in Example 5, using 1-methoxy-4-amino-2-butanol and thiophosgene.
Melting point = 88°C
Yield = 21%
Empirical formula = $C_6H_{11}NO_2S$ Elementary analysis:

|  |  | C | H | N |
|---|---|---|---|---|
| Calculated | % | 44.70 | 6.88 | 8.69 |
| Found | % | 44.73 | 7.01 | 8.71 |

The compounds of formula I have been studied on animals in the laboratory and have been shown to possess analgesic, spasmolytic, vasodilatatory, hypertensive and antidepressive properties.

1. Analgesic properties

The compounds of formula I administered by oral means on the mouse are capable of reducing the number of painful stretchings produced by the intraperitoneal injection of acetic acid.

The results obtained with a certain number of these compounds are given in the following Table I:

TABLE I

| Code No. of compound tested | Dose administered | Percentage protection |
|---|---|---|
| 69218 | 100 mg/kg/PO | 55% |
| 70264 | 50 mg/kg/PO | 65% |
| 70400 | 100 mg/kg/PO | 55% |

2. Spasmolytic properties

The compounds of Formula I, introduced in the conserving medium, are capable of opposing the contractural action of barium chloride on the isolated duodenum of the rat. This activity is evaluated by taking papaverine as standard.

By way of example, the spasmolytic activity of Compound No. 69218 is equal to three times that of papaverine.

3. Vasodilatatory properties

The compounds of formula I are capable of augmenting the flow of the coronary vessels of the isolated heart of a guinea pig when said compounds are added in the perfusion liquid of said organ.

By way of example, at a concentration of 2.5 µg/ml/mn in the perfusion liquid, the compound No. 69233 showed an 80% augmentation of the coronary flow.

4. Hypertensive properties

Administered by intraveinous means on the anaesthetized rat, the compounds of formula I provoke an increase in the arterial pressure.

Moreover, in a dose of 2 mg/kg/I.V., the compound No. 70108 produced a 30% increase in the arterial pressure of a rat for a period in excess of 30 minutes.

5. Antidepressive properties

The compounds of formula I, preventatively administered by oral means to the mouse, are capable of opposing the ptosis provoked by the injection of reserpine.

By way of example, the administration of 50 mg/kg/PO of compound No. 70264 reduces the ptosis by 80%.

One can see from the results shown in the following Table II that the difference between the pharmacologically active dose and the lethal dose is sufficiently great to permit the compounds of formula I to be used in therapeutics.

TABLE II

| Code No. of compound tested | Dose administered | Percentage mortality |
|---|---|---|
| 69218 | 2500 mg/kg/PO | ≈ 50 |
| 69233 | 1500 mg/kg/PO | 0 |
| 70108 | 2000 mg/kg/PO | 0 |
| 70264 | 470 mg/kg/PO | ≈ 50 |
| 70400 | 2200 mg/kg/PO | ≈ 50 |

The compounds of formula I are useful in the treatment of pain, digestive and other spasms, diverse circulatatory insufficiencies, hypotensions and depressive syndromes.

They may be administered by oral means in the form of tablets, dragees and gelules containing 50 to 400 mg of active ingredient (3 to 5 times a day) and by rectal means in the form of suppositories containing 50 to 200 mg of active ingredient (1 or 2 times a day).

Accordingly, the present invention also relates to a therapeutic composition comprising a compound of the general formula I together with a therapeutically acceptable carrier.

What we claim is:

1. A compound of the formula

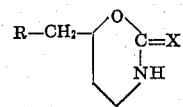

in which
X is oxygen or sulfur, and
R is methoxy, phenoxy or morpholino.

2. A compound according to claim 1, in which R is phenoxy.

3. A compound according to claim 2, in which X is sulfur.

4. A compound according to claim 2, in which X is oxygen.

5. A compound according to claim 1, in which R is methoxy.

6. A compound according to claim 5, in which X is sulfur.

7. A compound according to claim 5, in which X is oxygen.

8. A compound according to claim 1, in which R is morpholino.

9. A compound according to claim 8, in which X is sulfur.

10. A compound according to claim 8, in which X is oxygen.

* * * * *